United States Patent [19]

Ikeda

[11] Patent Number: 4,803,738

[45] Date of Patent: Feb. 7, 1989

[54] RADIO COMMUNICATIONS SYSTEM WITH REDUCED D/U RATIO VARIATIONS

[75] Inventor: Kiyoshi Ikeda, Tokyo, Japan

[73] Assignee: NEC Corporation, Tokyo, Japan

[21] Appl. No.: 12,227

[22] Filed: Feb. 9, 1987

[30] Foreign Application Priority Data

Feb. 10, 1986 [JP] Japan .................................. 61-25981

[51] Int. Cl.$^4$ ........................... H04B 1/60; H04B 7/02
[52] U.S. Cl. ........................................ 455/10; 455/33; 455/52
[58] Field of Search ........................ 455/33, 52, 73, 83, 455/67, 10, 9, 53, 54; 379/59, 60

[56] References Cited

U.S. PATENT DOCUMENTS

| | | | |
|---|---|---|---|
| 4,004,224 | 1/1977 | Arens et al. ............................ | 455/10 |
| 4,301,533 | 5/1981 | Acampora et al. .................... | 455/10 |
| 4,383,332 | 5/1983 | Glance et al. ......................... | 455/52 |
| 4,412,350 | 10/1983 | Miedema ............................... | 455/52 |
| 4,495,648 | 1/1985 | Giger ..................................... | 455/10 |
| 4,613,990 | 9/1986 | Halpern ................................. | 455/52 |

FOREIGN PATENT DOCUMENTS 0164349  7/1986  Japan .................................. 455/10

Primary Examiner—Robert L. Griffin
Assistant Examiner—Curtis A. Kuntz
Attorney, Agent, or Firm—Sughrue, Mion, Zinn, Macpeak & Seas

[57] ABSTRACT

A radio communications system has a node station centrally located in a covering area and a plurality of remote substations. The system comprises a plurality of transceivers in the node station, and a plurality of substation transceivers respectively located in the substations corresponding respectively to the node station transceivers to establish a plurality of pairs of two-way radio links therebetween. The covering area is divided into a plurality of concentric zones, each of the zones being assigned a pair of particular frequencies or a pair of particular polarization planes. Each zone has one or more substations. Transmission power level of each of the node station transceivers and each of the substation transceivers is adjusted so that fine-weather reception field strength at each end of those radio links having a greater length is greater than fine-weather reception field strength at each end of those radio links having a smaller length, there being a linear relationship between the field stength at each end of each radio link and the length thereof. The minimum azimuth angular spacing between adjacent substations can be reduced by a factor of ¼ to allow a greater number of substations to be accommodated in the system.

1 Claim, 2 Drawing Sheets

RADIO COMMUNICATIONS SYSTEM WITH REDUCED D/U RATIO VARIATIONS

BACKGROUND OF THE INVENTION

The present invention relates to a radio communications system in which a plurality of transceivers are located centrally in a node station on the one hand and a plurality of corresponding transceivers are located randomly in remote substations on the other to establish two-way radio links between the node station and substations.

The quality of the sub-to-node station radio link is determined by interference between adjacent substations and this intererence is quantitatively evaluated by the ratio of a signal which is transmitted from a desired substation and received at the main-lobe sensitivity of a node-station receiving parabolic antenna to a signal which is transmitted by an undesired substation and is usually received at a side-lobe sensitivity of the antenna. This desired-to-undesired (D/U) ratio is usually controlled to within a prescribed tolerable range. However, rainfalls cause different attenuation in the main-lobe and side-lobe transmission paths. In particular, if the desired and undesired substations are spaced apart a great distance, the main-lobe and side-lobe paths have a significantly different rainfall attentuation which can result in a deterioration of the D/U ratio.

According to prior art radio communications systems, a single frequency pair is assigned to the node station and all substations of the system and adjacent substations are usually spaced apart so that they subtend at the node station with a minimum azimuth angle of 90 to 120 degrees to satisfy the required D/U ratio. If an additional substation is to be located within this azimuth angle, the usual practice is to assign a different frequency pair to the additional radio links to maintain the D/U ratio within the required range. However, it is desired to increase the number of substations that can be accommodated within a given covering area.

SUMMARY OF THE INVENTION

It is therefore an object of the present invention to provide a radio communications system which can accommodate a greater number of substations to increase radio communications links in economical manner.

According to the present invention, a radio communications system has a node station centrally located in a covering area and a plurality of remote substations. The system comprises a plurality of transceivers in the node station, and a plurality of substation transceivers respectively located in the substations corresponding respectively to the node transceivers to establish a plurality of pairs of two-way radio links therebetween. The covering area is divided into a plurality of concentric zones, each of the zones being assigned a pair of particular frequencies or a pair of particular polarization planes. Each zone has one or more substations. The transmission power level of each of the node station transceivers and each of the substation transceivers are initially adjusted prior to the operation of the system so that fine-weather reception field strength at each end of those radio links having a greater length is greater than fine-weather reception field strength at each end of those radio links having a smaller length so that the field strength at each end of each radio link increases linearly as a function of the length thereof.

With the assignment of different frequency pairs or different polarization-plane pairs to the divided zones and the linearly increasing field strength as a fuction of distance from the transmitter station, the D/U ratio variation can be reduced by a factor of $\frac{1}{4}$, which represents a reduction of the minimum azimuth anglular spacing of the substation as viewed from the node station by a factor of 1/6 to 1/10.

Preferably, the fine-weather reception field strength is given by:

$$RL_k = \frac{ML_k - ML_{(k-1)}}{2} \times \frac{l_k - l}{l_k - l_{(k-1)}}$$

where,
$k$ = an integer variable including a unity value for identifying the zones;
$l$ = distance between the node station and each of the substations;
$l_k$ = distance from each end of each radio link to a boundary between $(k-1)$th zone and $k$-th zone;
$l_{(k-1)}$ = a distance from each end of each radio link to a boundary between $(k-2)$th zone and $(k-1)$th zone;
$RL_k$ = fine-weather reception field strength measured at distance $l_k$ if transmission power level of each of the two-way radio link is at maximum;
$ML_{(k-1)}$ = difference between the fine-weather reception field strength at distance $l_{(k-1)}$ and tolerable rainfall reception field strength thereat; and
$ML_k$ = difference between the fine-weather reception field strength at distance $l_k$ and tolerable rainfall reception field strength thereat.

BRIEF DESCRIPTION OF THE DRAWINGS

The present invention will be described in further detail with reference to the accompanying drawings, in which.

DETAILED DESCRIPTION

Figure 1:
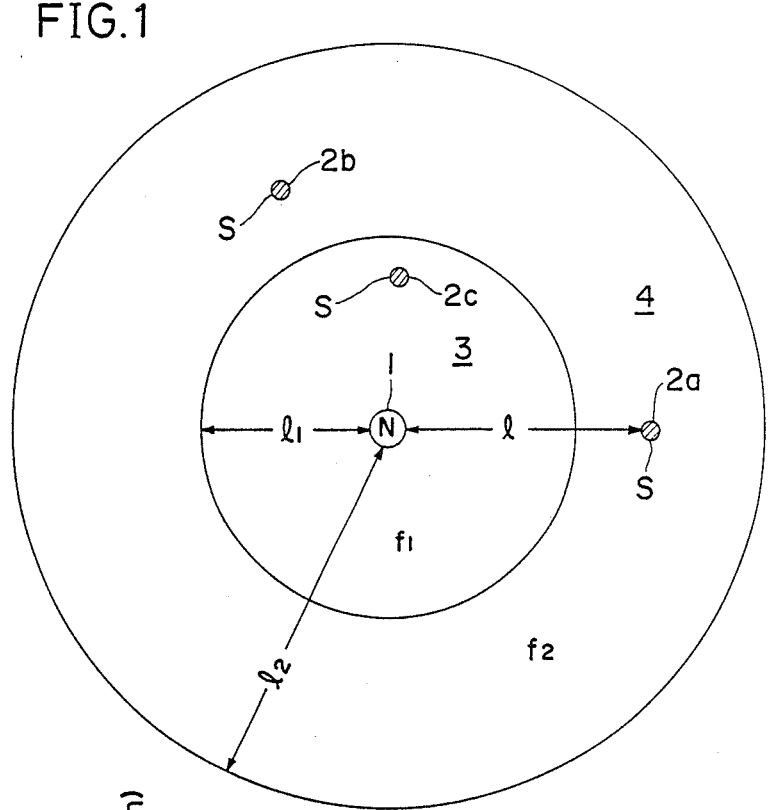
FIG. 1 is a schematic illustration of a covering area of a radio communications system.

In FIG. 1, a radio communications system embodying the present invention is schematically illustrated. The system comprises a node station 1 and substations 2a, 2b and 2c within a covering area. The covering area is divided into a central zone 3 and a plurality of concentric ring zones 4. For purpose of simplicity, only two zones are illustrated. Node station 1 is located at the center of central zone 3 and substations 2a and 2b are located in the outer zone 4, but spaced apart a sufficient distance from each other to permit the use of a common frequency pair to establish individual radio links without interference. Substation 2c is located within the center zone 3, but close to the substation 2b. The center zone 3 has a radium $l_1$ and the outer zone has a radius $l_2$ twice as great as radius $l_1$. Each zone is assigned a pair of particular frequencies, one for the node station and the other for the substations in that zone. In the illustrated embodiment, two frequency pairs $f_1$ and $f_2$ are assigned respectively to zones 3 and 4. Node station 1 establishes pairs of two-way radio links respectively to substations 2a and 2b on frequency pair f2 and a pair of two-way radio links to substation 2c on frequency pair $f_1$. With this per-zone frequency assignment, the desired-to-undesired signal (D/U) ratio of each node-to-substation radio link during precipitation can be reduced to one-half of the worst D/U value of a system which employs a single frequency pair for all zones.

Figure 2:
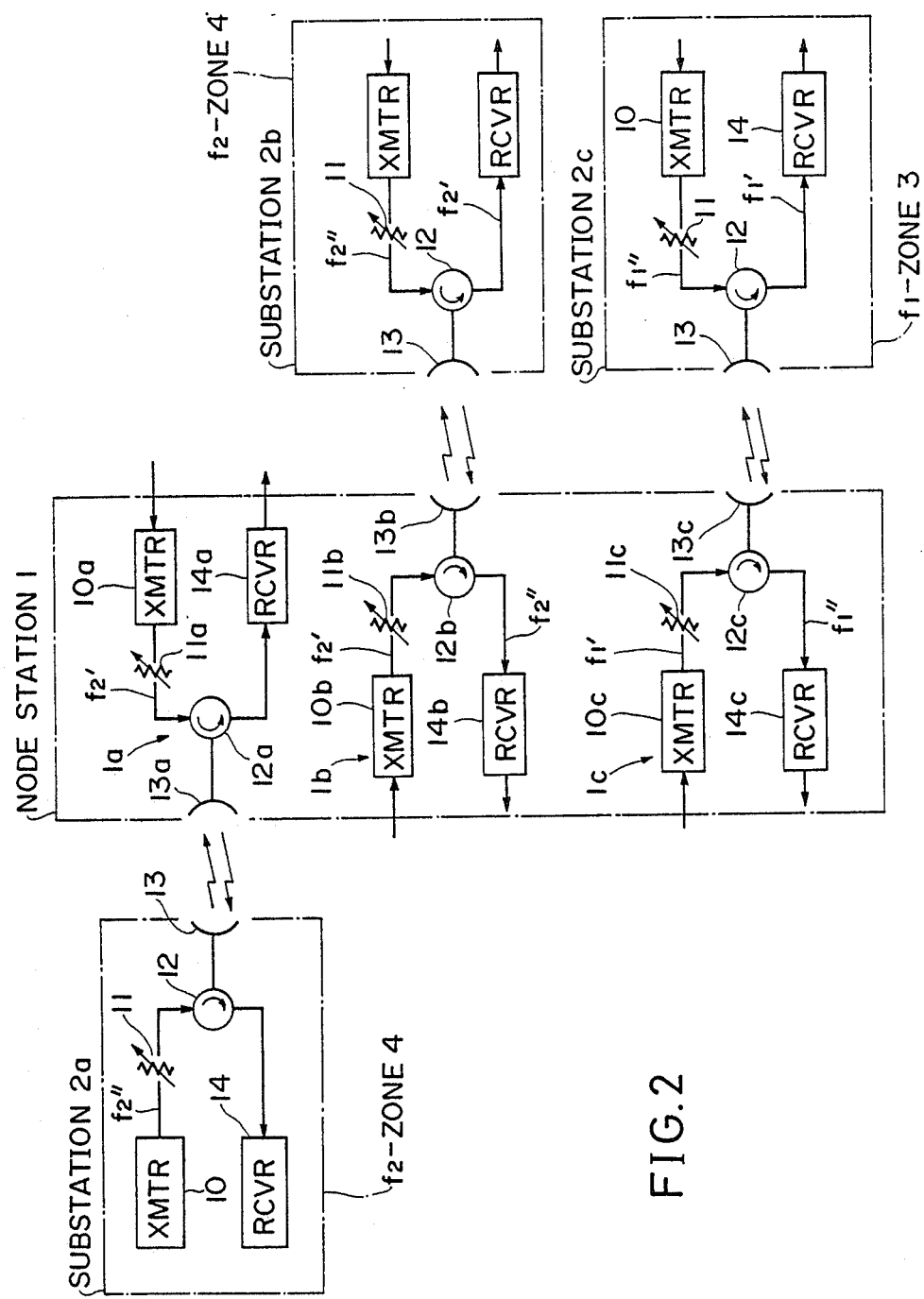
FIG. 2 is a block diagram of the radio communications system.

As shown in FIG. 2, node station 1 includes a plurality of transceiver units 1a, 1b and 1c associated respectively with substations 2a, 2b and 2c. Each node station transceiver unit comprises a transmitter 10 which modulates a carrier of a particular frequency with a baseband signal, a span attenuator 11 which couples the output of the transmitter 10 through a duplexer 12 to a parabolic antenna 13. A radio signal received by the antenna 14 is passed through the duplexer 12 to a receiver 14 which it is demodulated to a baseband signal. Node station transceiver units 1a and 1b are assigned transmit frequencies $f_2'$ for establishing radio links with substations 2a and 2c located in the frequency-$f_2$-zone 4 and node station unit 1c is assigned a frequency $f_1'$ for establishing a radio link with substation 2c located in the frequency-$f_1$-zone 3. Each of the substations is of identical construction to each transceiver unit of the node station. Substations 2a and 2b are assigned a frequency $f_2''$ to establish radio links with the transceiver units 1a and 1b of the node station and substation 2c is assigned a frequency $f_1''$ to establish a link with the transceiver unit 1c of the node station. Frequencies $f_1'$ and $f_1''$ form a frequency pair for the central zone 3 and frequencies $f_2'$ and $f_2''$ form another frequency pair for outer zone 4.

To minimize the variation of the D/U value, the span attenuator 11 at each station is adjusted to give the following relation for the central zone 3:

$$RL = RL_1 - \frac{ML_1}{2} \times \frac{l_1 - l}{l_1} \quad (1)$$

and the following relation for the outer zone 4:

$$RL = RL_2 - \frac{ML_2 - ML_1}{2} \times \frac{l_2 - l}{l_2 - l_1} \quad (2)$$

where,
l=length of each radio link;
RL=fine-weather reception field strength measured in dBm at distance l (see FIG. 3);
$RL_1$=fine-weather reception field strength measured in dBm at distance $l_1$ with the transmission power level of each radio link being adjusted to maximum;
$RL_2$=fine-weather reception field strength measured in dBm at distance $l_2$ with the transmission power level of each radio link being adjusted to maximum;
$ML_1$=tolerable loss, or a difference between the fine-weather reception field strength and tolerable rainfall reception field strength at distance $l_1$ from each end of each radio link; and
$ML_2$=tolerable loss, or a difference between the fine-weather reception field strength and tolerable rainfall reception field strength at distance $l_2$ from each end of each link.

Figure 3:
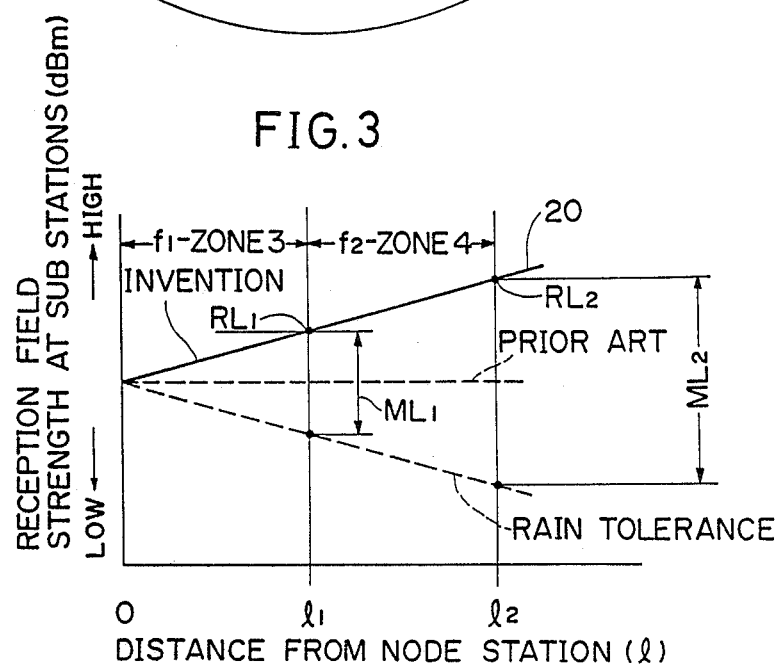
FIG. 3 is a graphic representation of the reception field strength characteristic at each substation in comparison with a corresponding characteristic of a prior art system.

Equations 1 and 2 follow a reception field-strength characteristic as indicated at 20 in FIG. 3 which shows that the reception field strength at each substation of the system increases linearly as a function of distance from the node station. The attenuator of each transceiver at the node station 1 is adjusted before inception of the system using known formulae so that the field strength of the corresponding substation satisfies Equation 1 or 2. In this way, the fine-weather D/U value of a radio link established between the node station and the nearest of the substations in a given zone is likely to suffer most from interference by the farthest substation of the same zone and the rainfall D/U value of a radio link between the node station and the farthest of the substations of a given zone is likely to suffer most from interference by the nearest substation of the same zone. With the field-strength adjustment just described, the D/U value of each radio link from the node to each substation varies in a range one-half the range of D/U variations of the node-to-substation link in the prior art method in which the field strength is usually adjusted at a constant value regardless of the distance from the node station.

The same field-strength adjustment is performed prior to inception of the system at each substation with respect to its sub-to-node station radio link using the substation span attentuator 11, so that the reception field strength at the node station end of the sub-to-node station link satisfies the linear Equation described above and a similar characteristic to that shown in FIG. 3 can be obtained at the node station with respect to each substation. The D/U value of the sub-to-node station radio link thus varies in a range one-half of the D/U variation range of the corresponding link of the prior art system.

The total variation of the D/U value of the present invention can therefore be reduced to ¼ of the prior art D/U variation. Since the node-station field strength of a signal from an undesired substation is also determined by the side-lobe sensitivity of an antenna of the node station and since the sensitivity of the antenna is nonlinear as a function of the azimuth angle, the ¼ reduction of the D/U ratio variation represents a reduction of the minimum azimuth angle between adjacent substations as viewed from the node station by a factor of 1/6 to 1/10 of the prior art minimum azimuth angle. Therefore, the number of substations that can be accommodated in a ratio communications system of the type as discussed above can be increased by a factor of 6 to 10.

While mention has been made of an embodiment in which different frequency pairs are assigned to different zones, different polarization planes could equally be as well assigned to different zones.

What is claimed is:

1. A radio communications system for covering an area which is divided into "k" concentric zones each being assigned a pair of particular frequencies or polarizations, comprising:
 a node station located at the center of said area and having a plurality of node station transceivers; and
 a plurality of substations located in said concentric zones at distance 1 from said node station and at distance $1_k$ from a boundary between (k-1)th and k-th zones and having a plurality of substation transceivers corresponding respectively to said node station transceivers to establish a plurality of pairs of two-way radio links therebetween,
 each of said node and substations having a fine-weather reception field strength at each of said radio links, the fine-weather reception field strength at each end of longer distance radio links being greater than the fine-weather reception field strength at each end of shorter distance radio links, there being a linear relationship between said fine-weather reception field strength at each of said radio links and the distance of each link, wherein said linear relationship is given by:

$$RL = RL_k - \frac{(ML_k - ML_{(k-1)})}{2} \times \frac{l_k - 1}{l_k - l_{(k-1)}}$$

where,

RL = fine-weather reception field strength of each of said links at distance 1;
$RL_k$ = fine-weather reception field strength of each of said links at distance $l_k$;
$ML_k$ = difference between the fine-weather reception field strength of each of said links at distance $l_k$ and tolerable rainfall reception field strength thereat; and
$ML_{(k-1)}$ = difference between the fine-weather reception field strength of each of said links at distance $l_{(k-1)}$ and tolerable rainfall reception field strength thereat.

* * * * *

UNITED STATES PATENT AND TRADEMARK OFFICE
CERTIFICATE OF CORRECTION

PATENT NO. : 4,803,738

DATED : February 7, 1989

INVENTOR(S) : Kiyoshi Ikeda

It is certified that error appears in the above-identified patent and that said Letters Patent is hereby corrected as shown below:

Column 1, line 15, delete "intererence" and insert --interference--.

Column 1, line 54, after "node" insert --station--.

Signed and Sealed this

Twenty-sixth Day of December, 1989

Attest:

JEFFREY M. SAMUELS

*Attesting Officer*  *Acting Commissioner of Patents and Trademarks*